United States Patent [19]
Elson

[11] 4,369,939
[45] Jan. 25, 1983

[54] ARTICLE DROPPING KITE

[76] Inventor: Lloyd C. Elson, 47 Hillyard St., Hamilton, Ontario, Canada, L7L 6B3

[21] Appl. No.: 241,822

[22] Filed: Mar. 9, 1981

[51] Int. Cl.³ .................... B64C 31/06; A63H 27/08
[52] U.S. Cl. .............................................. 244/155 R
[58] Field of Search .............. 244/155 R, 153 R, 154, 244/33

[56] References Cited
U.S. PATENT DOCUMENTS 3,052,434  9/1962  Tucci ............................ 244/155 R
4,183,481  1/1980  Elson ............................ 244/155 R

FOREIGN PATENT DOCUMENTS 608000  9/1948  United Kingdom ............ 244/155 R

Primary Examiner—Galen L. Barefoot
Attorney, Agent, or Firm—Hirons, Rogers & Scott

[57] ABSTRACT

A parachute dropping kite comprises at least one holding means, e.g. a pocket, preferably located on a keel guide of the kite. The, or each, pocket is to releasably secure a parachute unit associated with the kite and is open upwardly and is generally aligned with a kite string extending between an operator and the flying kite. A jerk on the kite string will tend to lower the flying kite slightly allowing the parachute unit or units to exit from the pocket by inertial force.

4 Claims, 5 Drawing Figures

ARTICLE DROPPING KITE

FIELD OF THE INVENTION

This invention relates to an article dropping kite, and more particularly relates to a kite which may be flown with one or more articles constituted, for example, by parachute units releasably mounted thereon and which by a mere jerk or tug on the kite string will be released to fall to the ground.

REVIEW OF THE PRIOR ART

Parachute dropping kites of various constructions are known in the art.

For example a kite of this type is described in my prior U.S. Pat. No. 4,183,481 in which a parachute unit is releasably secured to the covering on the underside of the kite by a holding means such as a pocket or a strap. A closure means is removably and frictionally associated with that holding means, and a closure means string is provided separate from the kite string, with one portion thereof being secured to the closure means and another portion thereof secured to the kite string at a position close to but spaced from the kite and of a length between these portions such that the closure means string is slack when the closure means is associated with the holding means during flight of the kite. The kite is further provided with a kite string length changing means associated with the kite string at the position where the closure means string is secured to the kite string or between that position and the kite, this length changing means being actuable by tugging on the kite string when the kite is in flight, to lengthen the kite string sufficiently that the closure means string becomes tightened and removes the closure means from the holding means to release the parachute. Where the parachute holding means is a pocket, the closure means may be a clip removably secured to the covering of the kite to close the opening of the pocket; where the holding means is a strap, one end may be permanently secured to the covering and the other end may be releasably secured to the covering by means of an appropriate closure means such as a pin.

Other prior art devices are discussed in some detail in my previous U.S. patent referred to above. Examples of such devices are those of Shepard, Canadian Pat. No. 179,666 issued Oct. 9, 1917; Silverthorn, Canadian Pat. No. 234,288, issued Sept. 17, 1923; Jacobi, U.S. Pat. No. 1,787,479, issued Jan. 6, 1931; Berthene, U.S. Pat. No. 2,575,157, issued Nov. 13, 1951; Albrecht, U.S. Pat. No. 1,735,309, issued Nov. 12, 1929; U.S. Pat. No. 3,430,899, of Zopf, issued Mar. 4, 1969 and Fisher, U.S. Pat. No. 2,059,634, issued Nov. 3, 1936. All of these previous devices, including that of U.S. Pat. No. 4,183,481, have required physical means for retaining the parachute to ride the kite and physical means to unlatch the retaining means to release the parachute therefrom. Such unlatching means, even when of very simple construction constitutes a mechanism which may develop faults in operation and which adds to the cost of construction of the device.

There is disclosed in U.K. Patent Serial No. 608,000 of Stanley D. Dickson an article dropping kite with which the article is retained on the kite as long as the kite remains in a normal flying altitude, the article being released automatically when the kite assumes a predetermined attitude, such as a predetermined banking angle or when the kite is diving. For example, the article can be a parachute that is an easy sliding fit in an open-ended pocket, so that it will fall from the kite as soon as the kite assumes the said predetermined attitude. Dickson specifies that his arrangements are particularly applicable to a two-stringed kite, and such a kite structure is necessary if release of the article is to be controlled from the ground.

SUMMARY OF THE INVENTION

It is the principal object of this invention to provide a new article dropping kite construction operable without a separate retaining means mechanism and employing a single kite string.

A "kite" as used herein is intended to include an aerodynamically shaped article which will become airborne on being towed on a line by a moving operator, or held in a moving air stream of sufficient strength by a stationary operator.

According to the present invention there is provided an article dropping kite comprising:

a kite body;

a kite string connected to the kite body for extension therefrom in a longitudinal flight direction to a kite operator on the ground while the kite is in flight in a flight attitude;

at least one releasable article adapted for releasable carriage by the kite while in the air;

holding means mounted on the kite body for frictionally releasably holding each article on the kite body in any normal flight attitude of the kite, said holding means permitting release of the article only in a direction that is upward against gravity and is at least approximately aligned with the said longitudinal flight direction of the kite string;

whereby a jerk of sufficient releasable speed and force along the longitudinal direction of the kite string during flight of the kite with a releasable article held thereon releasably overcomes the frictional holding of the article by the holding means under the effect of the inertia of the article for release of the article from the holding means and its subsequent dropping under gravity to the ground.

The article to be released may be a parachute unit or toy bomb or the like.

BRIEF DESCRIPTION OF THE DRAWINGS

One embodiment of the invention will now be described by way of example with reference to the accompanying drawings in which.

DETAILED DESCRIPTION OF THE DRAWINGS

Figure 1:
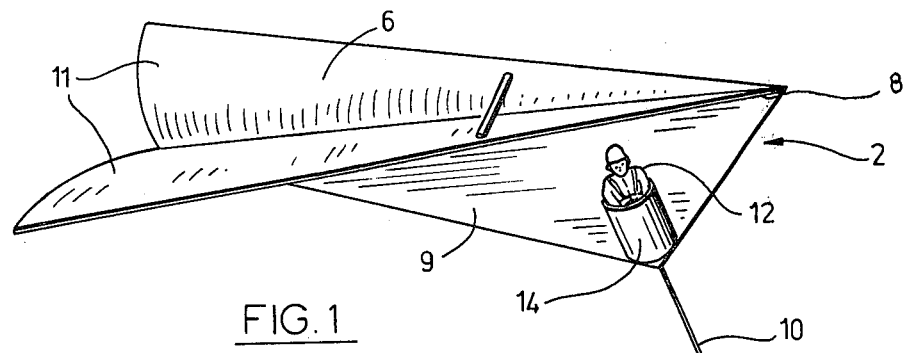
FIG. 1 is a side view of one example of a parachute dropping kite according to the invention.

In the Figures there is shown a parachute dropping kite 2 made from the combination of a covering 6 and a frame 8, the latter being made of any appropriate rigid members. The term "covering" as used herein is intended to refer to the fabric or sheet material associated with the frame of the kite. The kite has a guide keel 9 and wings 11 made from such a combination of rigid members and fabric or sheet material. A kite string 10 extends from the kite to the operator on the ground below, the string being fastened to the keel at its lowest point. A parachute unit 12, of any appropriate construction is associated with the kite 2, and two such units are releasably secured to the kite at the guide keel 9 by respective pockets 14 which open upwardly when the kite is in flight orientation, the pockets being provided one to each side of the keel guide 9.

Figure 4:
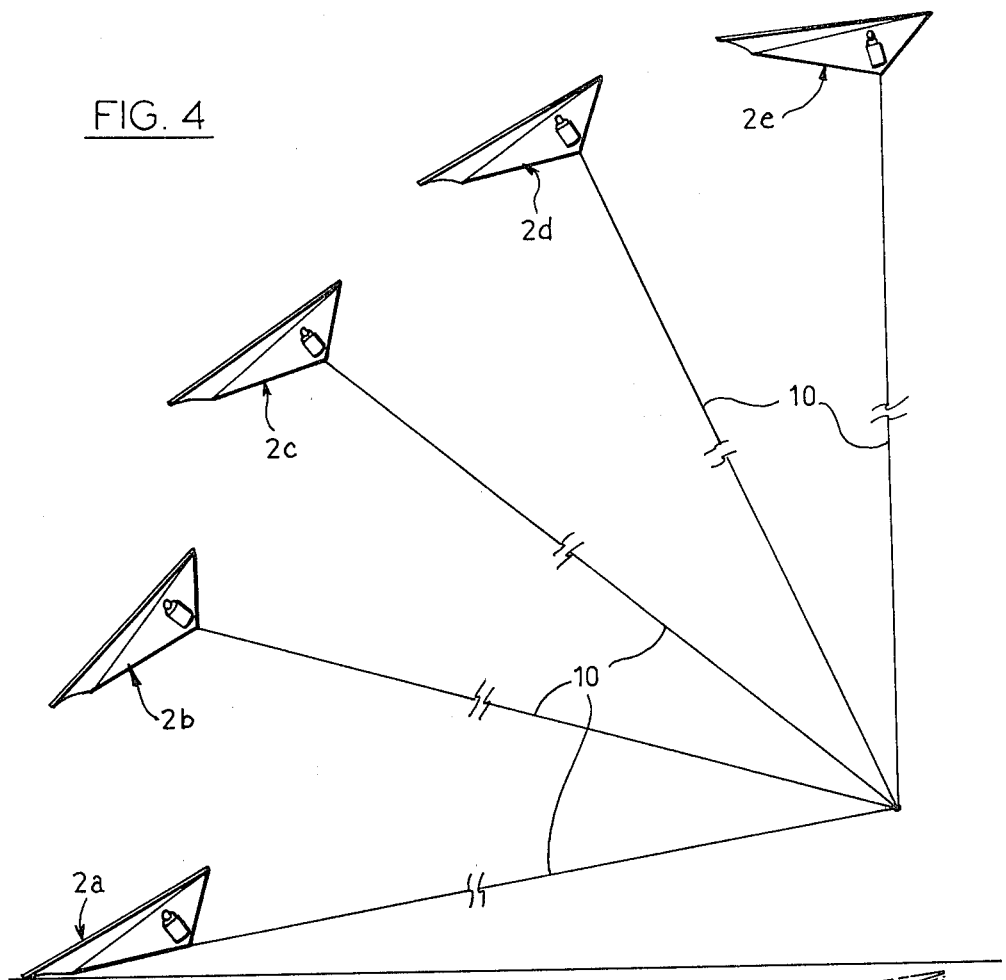
FIG. 4 is a sketch of the kite of the previous Figures in consecutive positions from take off illustrating the orientation of pockets holding parachute units in relation to the kite string.

Normal operation of the kite 2 from take off to flight attitude can be seen from FIG. 4. From take off in position 2A the kite rises through position 2B to normal flying position which may ordinarily vary between positions 2C, 2D and 2E. Pockets 14 are located on the keel guide 9 with their closed bottoms near the point of attachment of the kite string and so that their open mouths open upwardly and are as nearly as possible aligned with the longitudinal direction of the kite string 10 when in flying attitude. It can be seen that in position 2D the kite string 10 is properly aligned with pocket 14 and its open mouth, and in the adjacent flying positions 2C and 2E the pocket 14 is still approaching alignment with the kite string 10. If it is not so aligned the downward pull of the string will tend to so align it. FIG. 1 also illustrated the normally oriented flying position with pocket 14 aligned with string 10.

During this normal operation of the kite the parachute units 12 remain safely tucked into pockets 14 under the effect of gravity, the fit of the parachute units 12 within pockets 14 and the friction therebetween being sufficient to retain parachute units 12 within pockets 14 even when the kite 2 loops and turns wholly upside down.

Figure 2:
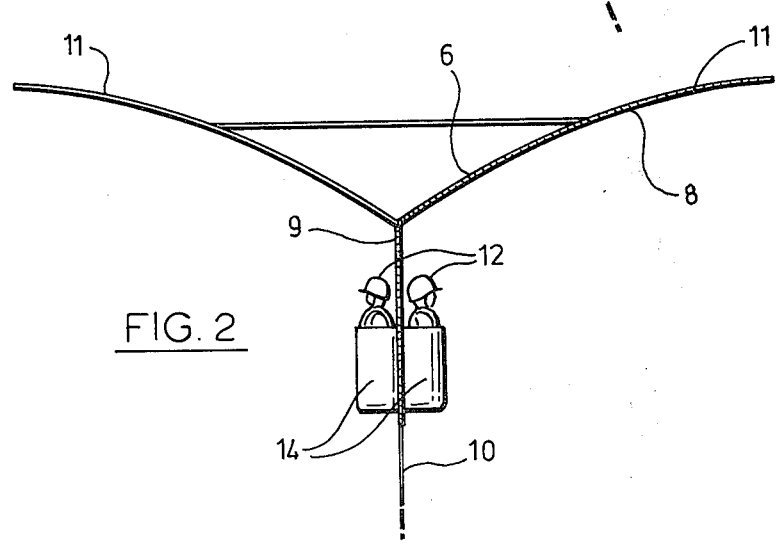
FIG. 2 is a front view of the kite of FIG. 1.
Figure 3:
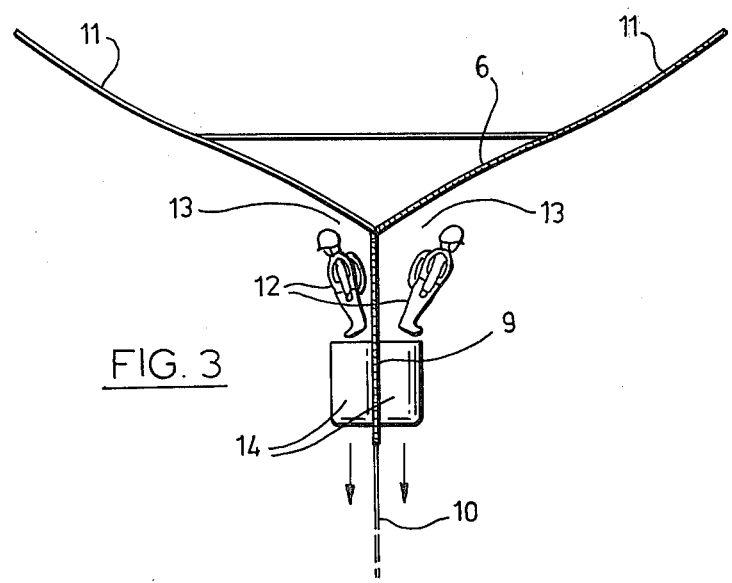
FIG. 3 is a front view of the kite of FIGS. 1 and 2 at the moment of release of parachute units.
Figure 5:
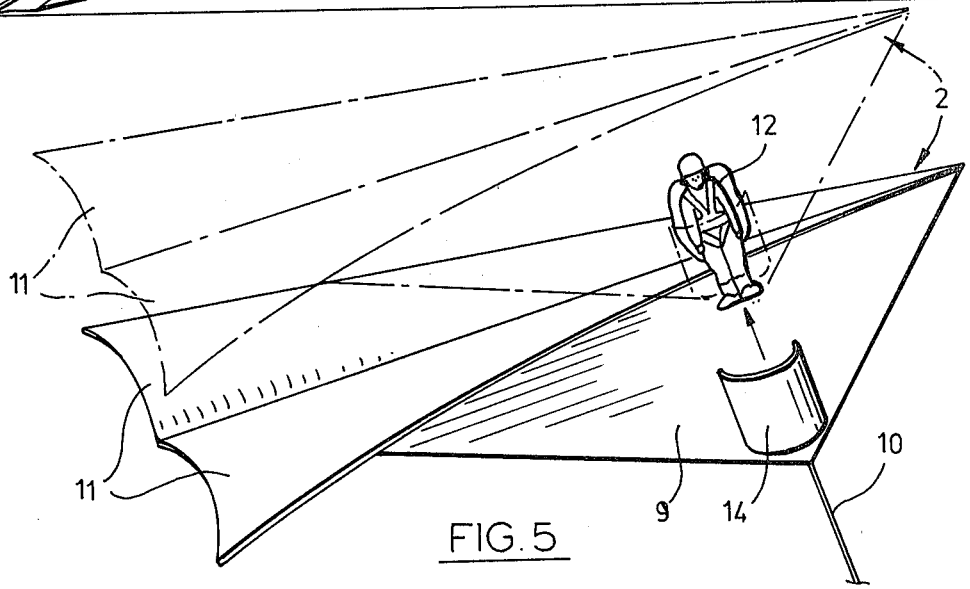
FIG. 5 is a side view of the kite similar to that of FIG. 1 but illustrated just after release of the parachute units, the previous position of the kite being indicated in broken lines.

When the kite 2 is in normal flying position, the parachute units 12 can be released from the pockets 14 by a sufficiently strong and fast jerk on the string 10. Such jerking has two effects. One effect is to suddenly lower the kite 2 from the position shown in broken lines in FIG. 5 to that shown in full lines in FIG. 5. This sudden downward movement is not transmitted, or only slightly transmitted, through friction to the parachute units 12. Thus through inertia these units 12 appear to pop upwardly out of pockets 14 and as they move downwardly the respective parachute can then open and fall to earth. Preferably the parachute units 12 slip as readily as possible with respect to inner pocket surfaces to facilitate release therefrom. The second effect of jerking the string is, to increase upward wind pressure on the underside of wings 11 thus temporarily flexing and distorting them upwardly to have convex under surfaces, as illustrated best in FIG. 3. Such upward distortion provides temporarily lessened wind resistance due to change in shape, and the curved undersurfaces 13 then act as guides for the emerging parachute units 12. When the movement of kite 2 through the air has finally compensated for the jerk and the resulting changing pressures on the kite the wings 11 return to the normal configuration shown in FIG. 2.

An alternative method of release is to pull the kite 2 gently downwardly and then allow it under the influence of wind to regain its former position relative to the operator with a jerk. In this case the upward movement of the kite is suddenly stopped leaving the unimpeded parachute units 12 with sufficient impetus to overcome the restraining friction and leave the pockets 14 to be released from the kite.

I claim:

1. An article dropping kite comprising:
   a kite body;
   a kite string connected to the kite body for extension therefrom in a longitudinal flight direction to a kite operator on the ground while the kite is in flight in a flight attitude;
   at least one releasable article adapted for releasable carriage by the kite while in the air;
   holding means mounted on the kite body for frictionally releasably holding each article on the kite body in any normal flight attitude of the kite, said holding means permitting release of the article only in a direction that is upward against gravity and is at least approximately aligned with the said longitudinal flight direction of the kite string;
   whereby a jerk of sufficient releasable speed and force along the longitudinal direction of the kite string during flight of the kite with a releasable article held thereon releasably overcomes the frictional holding of the article by the holding means under the effect of the inertia of the article for release of the article from the holding means and its subsequent dropping under gravity to the ground.

2. A kite as claimed in claim 1, wherein the said holding means comprise a pocket on the kite body adapted to frictionally releasably retain an article therein and having an open end which in any normal flight attitude of the kite has its opening upward and at least approximately aligned with the said longitudinal flight direction of the kite string.

3. A kite as claimed in claim 1 and including a keel that in flight attitude of the kite extends downwardly, wherein the said holding means comprise a pair of elongated pockets disposed on opposite sides of the kite keel and each adapted to frictionally releasably retain an article therein, each pocket having an open end which in any normal flight attitude of the kite has its opening upward and at least approximately aligned with the said longitudinal flight direction of the kite string.

4. A kite as claimed in claim 3, wherein the kite comprises a pair of flexible wings extending in opposite directions from the said keel, and wherein a jerk of said releasable speed and force along the kite string flexes the said wings to have respective convex under-surfaces which are impinged by the jerk-released articles and guided thereby in their releasing directions of movement from the kite.

* * * * *